United States Patent [19]

Caprara et al.

[11] Patent Number: 4,918,704
[45] Date of Patent: Apr. 17, 1990

[54] Q-SWITCHED SOLID STATE PULSED LASER WITH INJECTION SEEDING AND A GAUSSIAN OUTPUT COUPLING MIRROR

[75] Inventors: Andrea L. Caprara; Jean-Marc Heritier, both of San Jose, Calif.

[73] Assignee: Quantel International, Inc., Santa Clara, Calif.

[21] Appl. No.: 295,649

[22] Filed: Jan. 10, 1989

[51] Int. Cl.$^4$ ............................................. H01S 3/08
[52] U.S. Cl. ...................................... 372/99; 372/95; 372/10
[58] Field of Search .................. 372/99, 92, 95, 10, 372/108

[56] References Cited

U.S. PATENT DOCUMENTS

| | | |
|---|---|---|
| 3,360,925 | 1/1982 | Brosnan et al. |
| 4,156,209 | 5/1979 | Herbst et al. ........................ 372/95 |
| 4,310,808 | 1/1982 | Byer et al. |
| 4,327,129 | 4/1982 | Sepp ................................. 372/95 |
| 4,477,909 | 10/1984 | Salvi et al. ........................ 372/95 |
| 4,553,244 | 11/1985 | Benedict et al. ..................... 372/95 |
| 4,580,270 | 4/1986 | Johnson et al. ..................... 372/95 |
| 4,717,842 | 1/1988 | Komine . |

OTHER PUBLICATIONS

Yariv and Yeh, "Confinement and Stability in Optical Resonators Employing Mirrors with Gaussian Reflectivity Tapers", *Optics Communications*, vol. 13, No. 4, Apr. 1975, pp. 370-374.
Eggleston et al., "Radial Intensity Filters Using Radial Birefringement Elements", *J. Opt. Soc. Am.*, vol. 71, No. 10, Oct. 1981, pp. 129-137.
McCarthy and Lavigne, "Large-Size Gaussian Mode in Unstable Resonators Using Gaussian Mirrors", *Optics Letters*, vol. 10, No. 11, Nov. 1985, pp. 553-555.
Walsh and Knight, "Transverse Modes of a Laser Resonator with Gaussian Mirrors", *Applied Optics*, vol. 25, No. 17, Sep. 1, 1986, pp. 2947-3954.
De Silvestri et al., "Innovative Schemes for diffraction-Limited Lasers", Paper FP1, CLEO 87, Baltimore, 1987.
De Silvestri et al., "Radially Variable Reflectivity Output Coupler of Novel Design for Unstable Resonators", *Optics Letters*, vol. 12, No. 2, Feb. 1987, pp. 86.
Parent et al., "Effects of Hard Apertures on Mode Properties of Resonators with Gaussian Reflectivity Mirrors", *IEEE Journal of Quantum Electronics*, vol. QE-23, No. 2, Feb. 1987, pp. 222-228.

*Primary Examiner*—Leon Scott Jr.
*Attorney, Agent, or Firm*—Majestic, Parsons, Siebert & Hsue

[57] ABSTRACT

A Q-switched pulsed laser resonant cavity having an output coupling mirror with a radially variable reflectivity function across its surface and a magnification level that combine to provide a very high discrimination against transverse modes of oscillation higher than a desired fundamental mode. This resonant cavity is especially adapted for use with injection seeding to limit the longitudinal modes of oscillation to one mode. The cavity arrangement develops a high powered light pulsed beam at its output that also has a uniform intensity profile.

10 Claims, 2 Drawing Sheets

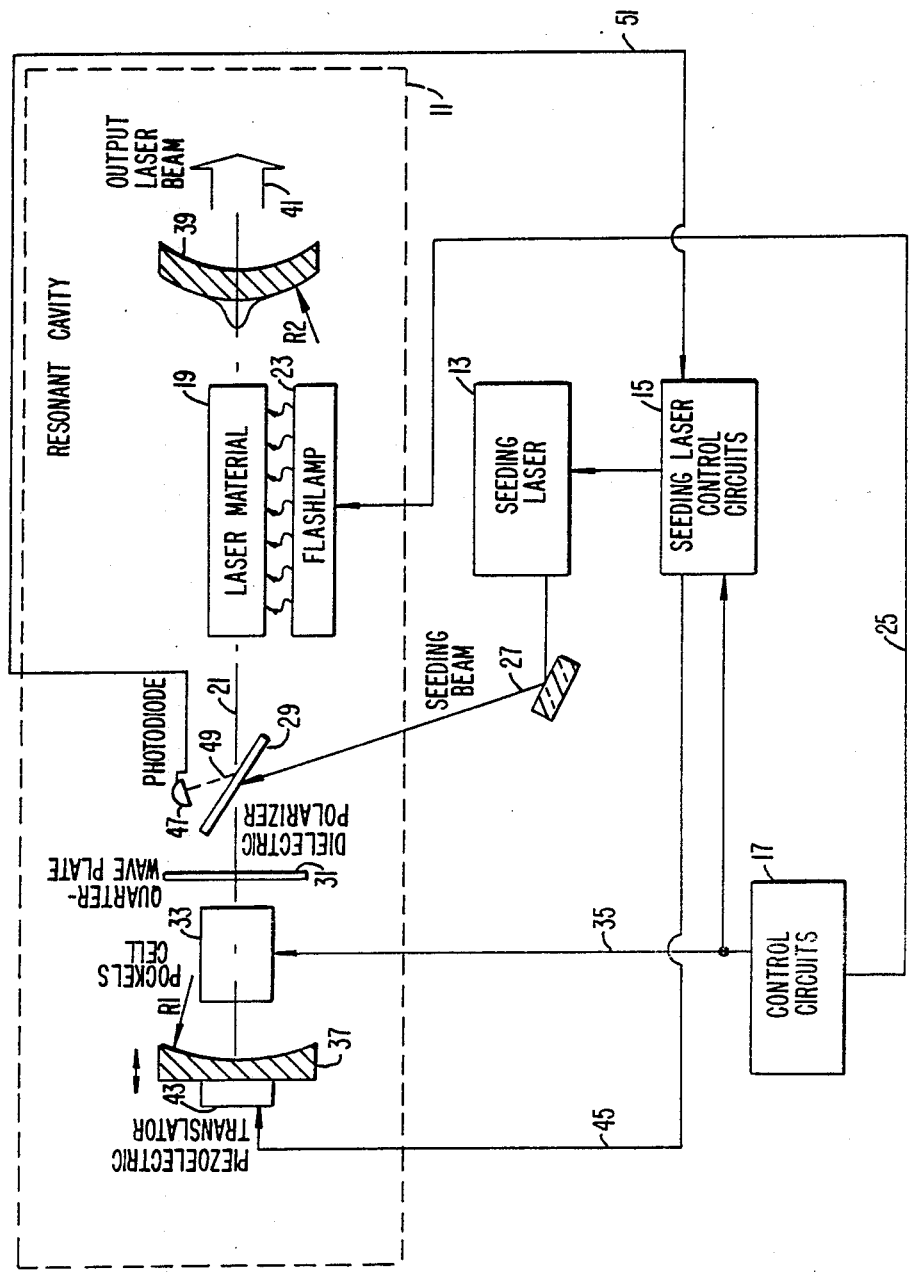
FIG._1.

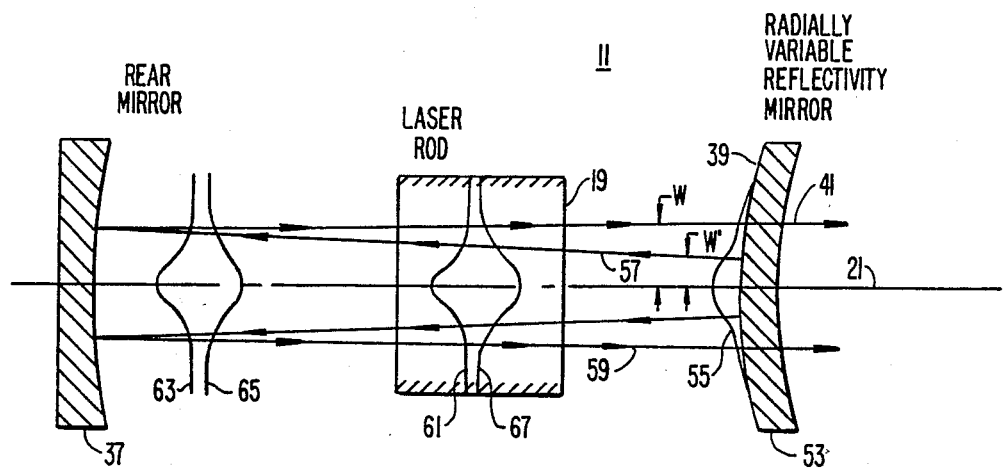
FIG._2.
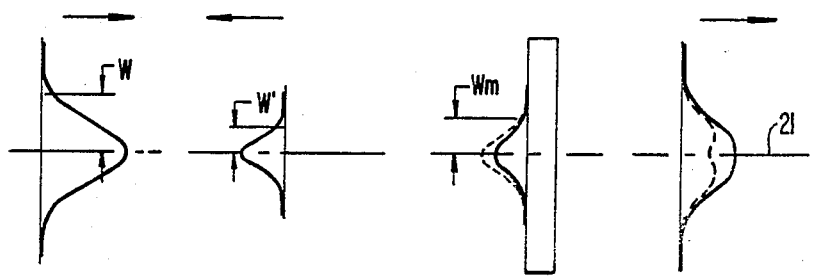
FIG._3A.
INCIDENT BEAM 59
INTENSITY PROFILE
FIG._3B.
REFLECTED
BEAM 57
INTENSITY PROFILE
FIG._3C.
MIRROR 39
REFLECTIVITY
PROFILE
FIG._3D.
OUTPUT BEAM 41
INTENSITY PROFILE
FIG._3.

Q-SWITCHED SOLID STATE PULSED LASER WITH INJECTION SEEDING AND A GAUSSIAN OUTPUT COUPLING MIRROR

BACKGROUND OF THE INVENTION

This invention is related generally to the art of the construction and operation of lasers, and specifically to solid state pulse lasers that are Q-switched and injection seeded.

The basic structure common to nearly all lasers is well known. A light amplifying medium is positioned between two mirrors that forms a cavity between them that is resonant to oscillations of light having wavelength desired to be produced. An output beam of the laser is usually derived through one of the mirrors, in which case it is made to be only partially reflective, or around one of the mirrors, in which case it is made totally reflective. The light amplifying material may be in a gaseous, liquid or solid form, depending upon the type of laser and its specific desired characteristics. Lasers are also made to either operate with a continuous wave (c.w.) light output, or are designed to provide repetitive light pulses, the structure of each of these types of lasers being quite different.

A pulsed laser most commonly utilizes light amplifying material in the form of a rod. The most common material for the rod neodymium doped yttrium aluminum garnet (Nd:YAG). Energy is stored in the rod from a pulse of broad-band light from a flash lamp. That energy is subsequently released as a pulse of laser light by the opening of a Q-switch (shutter) that is positioned within the resonant cavity between the rod and one of its end mirrors.

A great deal of attention has been paid to designing the resonant cavity to oscillate in a few of the large number of transverse and longitudinal modes that a basic cavity and given light amplifying material will support. Oscillation in a single transverse mode is desired, the fundamental transverse mode being preferred because of its relatively uniform intensity profile across the laser beam within the cavity and thus in the output beam as well. A single transverse mode is also selected so that the oscillation may be limited to a single longitudinal mode, since each transverse mode supports oscillation in a large number of longitudinal modes. Because each longitudinal mode oscillates at a different frequency, a single longitudinal mode is selected in order to minimize the bandwidth, and thus maximize the coherence, of the output laser beam.

A single longitudinal mode can be selected by including a narrow band optical filter within the resonant cavity. Recently, however, a much more effective technique for selecting a single longitudinal mode has been developed and commercialized. This technique includes the injection of a continuous wave beam from an external, low power laser, into the cavity to seed the light amplifying material, commonly called an "injection seeding" technique.

The most commonly utilized laser oscillator resonators are classified int one of two types. A "stable" resonator is the simplest, having its end mirrors shaped to limit the size of the beam within the resonant cavity. Oscillation is generally limited to the fundamental, single transverse mode by the use of a pin hole within the cavity. The laser output beam has a highly uniform intensity profile across it, a very desirable characteristic. However, the controlled size of the laser beam within the oscillator is very small unless the resonant cavity is made to be much longer than usually desired. A small beam necessarily interacts with only a limited volume of the light amplifying material. The result is a laser output beam with limited energy. However, its intensity profile is highly uniform, so stable resonators are often used where a high energy output is not so important. An injection seeded, Q-switched solid state laser utilizing a resonant cavity provides a very good quality beam but requires a substantial amount of amplification of the output beam pulses for most applications.

The second general type of laser oscillator resonator is referred to as an "unstable" type. In this type, the end mirrors of the resonant cavity do not limit the cross-sectional size of the laser beam oscillating within it but rather allow the cross-sectional size of the beam to increase during each pass of the beam in one round trip through the resonator. The size of the beam is usually limited in such lasers, either by the outer surface of the laser rod, in solid state systems, or by some other abrupt aperture. Such a resonator has an advantage of developing a higher energy output beam because it interacts with a full volume of the laser rod. However, it has the disadvantage of providing a laser output beam with poor intensity uniformity across it because of the edge diffraction effects of the abrupt aperture within the resonant cavity.

The injection seeding technique is becoming the prevalent one for limiting longitudinal modes within a Q-switched pulsed laser. However, injection seeding requires a higher degree of transverse mode discrimination within the resonant cavity than do other types of lasers. Therefore, it is a primary object of the present invention to provide a laser resonant cavity structure having a high degree of transverse mode discrimination, while at the same time being capable of generating high energy light pulses at its output and producing a laser output beam having a uniform intensity distribution profile.

SUMMARY OF THE INVENTION

This and additional objects are accomplished by the present invention, wherein, briefly and generally, use of a Gaussian-like output coupling mirror in the resonator cavity is particularly advantageous in a Q-switched, injection seeded laser because of the very high degree of transverse mode discrimination that can be obtained by such a resonator. A primary characteristic of such a resonator is the use of an output coupling mirror that has a smoothly varying reflectivity function from a maximum partial reflectivity at the resonator axis and a gradually decreasing reflectivity from the center outward. Such an output coupler is often referred to as a "Gaussian" mirror because its partial reflectivity profile resembles the mathematical Gaussian function.

In a preferred form, the shape of the mirrors and characteristics of other optical components within the cavity are chosen to result in a beam magnification. That is, a small diameter beam having a Gaussian-like intensity distribution thereacross is reflected from the Gaussian mirror, through laser amplifying material and other optical elements in the cavity to the opposite mirror, and then reflected back through the laser amplifying material to the Gaussian mirror, at which point it has a larger diameter than when it started. The larger diameter of the laser beam when it passes back through the laser rod is controlled to be approximately equal to but slightly less than the cross-sectional size of the rod. This gives a high energy light pulse output without degrading the intensity profile across the output beam that could be caused by diffraction effects at the outer surface of the laser rod. The amount of beam magnification in one pass through the laser cavity is coordinated with the reflectivity function across the surface of the Gaussian mirror in order to obtain a maximum transverse mode discrimination within the cavity without degrading the intensity profile of the output beam. The result is a high light pulse energy output with a controlled, uniform intensity distribution across the output beam, derived from a single, fundamental transverse mode of oscillation with the resonant cavity. Details of such a structure have been described by Caprara et al., "Injection Seeding of a Nd:YAG Laser Utilizing a Radially Variable Reflectivity Output Coupler", *Proceedings of SPIE O-E-LASE Conference,* Volume 912, pages 21-32 (January, 1988), which is incorporated herein by reference.

Additional objects, advantages and features of the various aspects of the present invention will become apparent from the following description of a preferred embodiment thereof, which description should be taken in conjunction with the accompanying drawings.

BRIEF DESCRIPTION OF THE DRAWINGS

FIG. 1 schematically illustrates an injection seeded, Q-switched pulse laser system that utilizes the various aspects of the present invention;

FIG. 2 shows in more detail a preferred resonant cavity of the laser system of FIG. 1; and FIGS. 3A-3D illustrate light intensity distributions near the output coupling mirror and the mirror's reflectivity function.

DESCRIPTION OF A PREFERRED EMBODIMENT

Referring to FIG. 1, a laser system includes a resonant cavity 11, in which light oscillations are stimulated, a continuous wave laser 13 external of the resonant cavity 11, control electronics 15 for the seeding laser, and laser system control electronics 17. Within the resonant cavity is a solid rod 19 of a light amplifying medium. A common material is neodymium doped yttrium aluminum garnet (Nd:YAG). The solid material is in a cylindrical shape with an axis of the cylinder coincident with an optical axis 21 of the resonant cavity 11. A flash lamp 23 illuminates the laser rod 19 with periodic pulses of broad band light, under the control of the system control electronics 17, through circuits 25.

A beam 27 from the seeding laser 13 is directed into the resonant cavity and reflected off of a dielectric polarizer 29. A quarter wave plate 31 and Pockels cell 33 are also aligned along the axis 21 of the cavity 11. As is well known, the quarter wave plate 31 and Pockels cell 33 operate as a Q-switch. When energized, the Pockels cell 33 does not affect the light passing through it. The presence of the quarter-wave plate, in conjunction with the dielectric polarizer, prevents build up of radiation inside the cavity. When energized by the control electronics 17 in a circuit 35, the Pockels cell counteracts the effect of the quarter-wave plate, thus allowing radiation to propagate unaltered in the resonant cavity 11.

Such oscillation occurs by reflection between a concave mirror 37 at one end of the cavity 11, and a convex mirror 39 at an opposite end. The mirror 39 is only partially transparent, and serves as an output coupler for escape of a laser output beam 41. A portion of the light within the resonant cavity 11, however, is reflected by the mirror 39 in order to maintain the desired light oscillations. The mirror 39 is also characterized by having a varying reflectivity across its surface. This is described in detail below with respect to FIGS. 2 and 3.

In order to tune the resonant cavity to optimally match the frequency of the seeding laser beam 27 being injected into the cavity 11, the mirror 37 is mounted on a piezoelectric transducer 43. The transducer 43 is energized through circuits 45 from the seeding laser control circuits 15. A photodetector 47 is positioned to receive a low intensity beam 49 of laser light that is reflected off the dielectric polarizer 29. This is a small proportion of the laser light being amplified within the resonant cavity 11. Its signal is connected by circuits 51 to the seeding laser control circuits 15. These control circuits then monitor the pulse trigger in circuits 35 and the laser light pulse developed in the cavity 11 from the photodetector 11. The control circuits 15 drive the transducer 43 to position the mirror 37 to minimize the interval between the Q-switched trigger pulse and resulting laser light pulse. This condition of minimum interval defines the length of the resonator that exactly matches the frequency of the injected signal.

Such an injection seeding system is commercially available from Lightwave Electronics Co. of Mountain View, Calif. An "S-100 Injection Seeding System User's Manual" from Quantel International provides an overall description of such a system, which description is incorporated herein by reference.

The operation of such a Q-switched laser system is well known. Light from the flash lamp 23 is absorbed by the laser rod 19. Very shortly after such a light flash, the Pockels cell 33 is opened and a pulse of laser light rapidly builds up in oscillations between the mirrors 37 and 39. One effect of using the seeding laser beam 27 is that the oscillation will occur in a single longitudinal mode at a frequency controlled by that of the injected beam 27. However, in order to limit oscillation to a single longitudinal mode, the resonant cavity 11 must be designed to have a very high degree of transverse mode discrimination. It is desired to assure that only the fundamental transverse mode oscillates within the cavity 11 during each laser pulse. This also makes possible the generation of a laser output beam 41 having a good cross-sectional intensity profile. Further, diffraction effects from edges of elements in the cavity 11 must be avoided. At the same time, it is desired that substantially the entire volume of the laser rod 19 be utilized to amplify light within the cavity 11, thus maximizing the energy output of the laser light pulses.

These desirable characteristics are accomplished by the laser system of the present invention, as can best be seen from the representations of FIGS. 2 and 3.

FIG. 2 is a schematic illustration of the resonant cavity 11, with emphasis upon the elements necessary to describe its unique features, which elements are shown in exaggerated relative dimensions. The output coupling mirror 39 is preferably constructed of a substrate 53 having an anti-reflection coating deposited on both faces with a dielectric layer 55 of varying thickness deposited on the coating on the convex face. The dielectric layer 55 has a varying thickness, as indicated in FIG. 2, in order to provide a variable reflectance across the surface of the mirror 39. Additional details of the preferred structure for the mirror 39, and methods of manufacturing it, are given in a paper by Lavigne et al., "Design and Characterization of Complimentary Gaussian Reflectivity Mirrors", *Applied Optics,* Volume 24, No. 16, pages 2581-2586 (1985), which is incorporated herein by reference.

The peak reflectivity, as illustrated in the solid line of FIG. 3C, occurs at the optical axis 21 of the resonant cavity 11. The peak reflectivity of the mirror 39 on the axis 21 is preferably something less than 50 percent, for reasons described hereinafter. The reflectivity then trails off according to the smooth function illustrated in FIG. 3C at distances on the surface of the mirror 39 removed from the axis 21, in all radial directions. That is, the mirror is more transmissive of light at positions further removed from its center, which is coincident with the axis 21. The smooth reflectivity function of FIG. 3C looks something like the mathematical Gaussian function, thus a mirror of the type 39 is often called a "Gaussian" mirror. However, it is not particularly necessary that its reflectivity profile follow the Gaussian function. The primary criteria for designing a reflectivity function is to provide one that, when Fourier analyzed in terms of spatial frequencies, provides a reflected spatial frequency spectrum which contains substantially no spatial frequencies higher in value than a reciprocal of the transverse side of the reflectivity profile. The principal goal is to avoid any rapid changes in reflectivity that might introduce high spatial frequency modulation into the laser beam.

Light is reflected off the mirror 39 in a small beam 57 that passes through the laser rod 13, strikes the reflector 37 and is passed back in an opposite direction as a beam 59, through the laser rod 19 and onto the output coupling mirror 39. A portion of the light of the beam 59 is then again reflected as smaller diameter beam 57, while most all of the remaining intensity of the beam 59 passes out of the laser cavity as output beam 41.

Because the mirror 39 has a varying reflectance function across it, that function modulates the intensity of the incident beam 57. The intensity profile of the beam 57 immediately after being reflected from the mirror 39 is shown in FIG. 3B. Similarly, the intensity profile of the incident beam 59 just before striking the mirror 39 is shown in FIG. 3A.

The reflectivity function of the mirror 39 maintains a Gaussian-like intensity distribution profile of the laser beam throughout its pass within the cavity 11. FIG. 3B shows such a function when first reflected from the mirror 39, intensity profiles 61 and 63 at different locations along the beam 57 having the same general shape intensity distribution. The beam 59 has similar Gaussian-like intensity distributions along its length, as indicated at different locations by the curves 65 and 67, finally to have a similar distribution just before striking the mirror 39, as indicated in FIG. 3A.

The edges of the beams 57 and 59 shown in FIG. 2 ar intended to indicate that position in the beam removed from its center on the cavity axis 21 where the intensify has dropped to $1/e^2$ of the maximum center intensity, "e" being the natural logarithm constant 2.71828. This radial distance in the incident beam 59 is indicated to be W on FIGS. 2 and 3A. Similarly, that distance on the reflected beam 57 is indicated to be W'. The curvature of the mirrors 39 and 37 is chosen so that, given Pockels cell, quarter wave plate and other elements in the cavity, that the beam has a controlled magnification in one pass in both directions between the mirrors 37 and 39 that is given by W/W'. Similarly, a radius $W_m$ (FIG. 3C) is defined for the reflectivity function of the mirror 39, it being the radius at which the reflectivity has fallen to $1/e^2$ multiplied by its peak reflectivity in its center.

In order to obtain the maximum output laser power from a rod 19 of a given radius r, the incident beam 59 should fill the rod 19. However, if the beam strikes the outer cylindrical surface of the rod 19 with any significant intensity, light will be diffracted at the edge and this will cause disturbances in the desired uniform intensity profile in the output beam 41. Thus, the radius of the incident beam 59 when passing through the rod 19 is made such that the rod radius r is about 1.5 times the radius of the beam 59. The beam radius indicated in FIG. 2 is the measure of the distance from the maximum intensity center of the beam to a location where its intensity has dropped to $1/e^2$ of that maximum intensity. Of course, as shown in FIG. 3A, there is some intensity in the beam beyond that radial distance which is taken to be the outer limits for the purpose of the illustration of FIG. 2. But the factor of about 1.5 assures that no significant amount of intensity strikes the outer edges of the rod 19.

Transverse modal discrimination of the cavity 11 is improved as the magnification of the cavity increases. It has been found that the magnification should be greater than about 1.3. That is, the ratio of the diameters of the incident beam 59 and the reflected beam 57, W/W', should be in excess of about 1.3. As magnification goes up, assuming that the maximum size of the incident beam 59 through the laser rod 19 cannot increase, the radius $W_m$ of the mirror 39 must decrease. That is because the reflecting beam 57 must be made smaller, and that occurs when the mirror is made smaller. However, it will be noted by comparing FIGS. 3B and 3C that the radius W' of the reflected beam 57 is somewhat smaller than the radium $W_m$ of the mirror 39, generally by a factor of about 20 percent, because of boundary conditions on the incident beam 59 which is reflected from the mirror.

The smaller mirror radius and larger magnification result in transverse modes higher than the fundamental mode having their off-axis intensity peaks striking the mirror 39 at regions of reduced reflectivity. The desired fundamental mode, however, has its maximum intensity on the cavity access 21 and thus enjoys the maximum reflection from the mirror 39.

The maximum peak reflectivity that should be provided by the mirror 39 is the reciprocal of the beam magnification after being squared. If the peak reflectivity is higher than that, such as indicated in dashed outline in FIG. 3C, the intensity profile of the output beam will develop a reduced intensity center portion, as indicated by the dashed outline in FIG. 3D. Thus, in order to void such a distortion in the output beam 41, the peak reflectivity of the mirror 39 is controlled to stay within this limit. This creates a practical upper limit of magnification of the resonant cavity 11 because of a requirement that at least about five percent of the intensity of the incident light beam 59, as an average, be reflected from the mirror 39 back into the resonant cavity 11 in order to support laser oscillations. If the magnification is made too large, the peak reflectivity of the mirror 39 must be reduced in order to maintain a uniform profile on the output beam 41. So the magnification cannot be increased to the point where the average reflectance from the mirror 39 is less than about five percent. The average reflectance of the mirror 39 should not be higher than the reciprocal of the magnification to the fourth power in order to avoid a reduced intensity center portion in the spatial profile of the output beam. These limits make a magnification (W/W') of around 2.0 to be optimum. A magnification within a range of about 1.3 to 2.2 results in optimizing the power output of the laser as well as the intensity profile across the output beam.

From the above ranges of magnification, the radius of beam 59, and the radius of the output coupling mirror 39, it can be seen that an optimal range of a ratio of the laser rod 19 radius r to the radius $W_m$ of the mirror 39 is about 1.5 to 3.0. This results in a given laser rod cross-sectional size being utilized the most efficiently, while transverse modal discrimination and output beam intensity profile are optimized.

In a specific implementation of a laser being described as a preferred embodiment, the laser rod 19 is 12.5 cm. in length along axis 21 and has a radius r=3 mm. The distance between the mirrors 37 and 39 is 45 cm. along the axis 21, the rod 19 being positioned 20.5 cm. from the mirror 37 and 12 cm. from the mirror 39. The mirror 37 has a radius of curvature $R_1 = 5$ m., and the mirror 39 has a radius of curvature $R_2 = -2.2$ m. The radius $W_m$ of the mirror 39 is about 0.33 the radius r of the laser rod 11, or 1.0 mm. The peak reflectivity of the mirror 39 is 12 percent.

Although the present invention has been described with respect to a preferred embodiment thereof, it will be understood that the invention is entitled to protection within the full scope of the appended claims. For example, the preferred embodiment described utilizes circular optical elements that are symmetrical about a single axis and have radially varying functions. The same principles can be applied to a laser having rectangular or other shaped elements for particular applications.

It is claimed:

1. In a pulsed laser system having a quantity of solid state light amplifying material positioned within a resonant cavity on an optical axis thereof between first and second mirrors in a manner that laser light oscillates between said mirrors through the light amplifying material, a laser output beam being directed through said second mirror and out of said resonant cavity, an optical arrangement comprising:

means including a flashlamp directing a pulse of optical energy to said light amplifying material for exciting said light amplifying material to emit light, Q-switch means positioned along said optical axis between said light amplifying material and one of said first and second mirrors for controllably attenuating said emitted light passing therethrough, means illuminating said light amplifying material with a coherent beam of light from a source external to said resonant cavity for limiting operation of the laser system to a single longitudinal mode of said laser light, said second mirror having a partial reflectivity that varies as a substantially continuous smoothly varying function of radial position across a surface of said mirror, a maximum partial reflectivity occurring substantially coincident with said optical axis at a center of the varying partial reflectivity function, thereby providing partial transmission of laser light therethrough out of said resonant cavity as the pulsed laser output beam, and the relative curvature of said first and second mirrors and the optical characteristics of other elements in the resonant cavity being chosen to cause a diameter of the laser light returning to the second mirror to be greater than the diameter of the light reflected from the second mirror by a magnification ratio that is in excess of substantially 1.3.

2. The pulsed laser optical arrangement according to claim 1 wherein the partial reflectivity function across said second mirror is such that when Fourier analyzed in terms of spatial frequencies, its spatial frequency spectrum contains substantially no spatial frequencies higher in value than a reciprocal of the transverse size of said reflectivity profile, thereby avoiding high frequency modulation across the output laser beam.

3. The pulsed laser optical arrangement according to claim 2 wherein said second mirror includes a substrate and a dielectric material layer carried thereby that is characterized by a profile having a maximum thickness at the center of said varying partial reflectivity function and a gradually decreasing thickness at radial positions removed from said center.

4. The pulsed laser optical arrangement according to claim 1 wherein the partial reflectivity function across said second mirror substantially corresponds to a mathematical Gaussian function.

5. The pulsed laser optical arrangement according to claim 1 wherein said second mirror includes a substrate and a dielectric material layer carried thereby that is characterized by a profile having a maximum thickness at the center of said varying partial reflectivity function and a gradually decreasing thickness at radial positions removed from said center.

6. The pulsed laser optical arrangement according to any of claims 1-5 wherein the maximum partial reflectivity of said second mirror is substantially less than 50 percent of the laser light incident thereon, substantially all of the remaining laser light incident thereon being transmitted through said second mirror and out of said resonant cavity as said output laser beam.

7. The pulsed laser optical arrangement according to any of claims 1-5 wherein the relative curvature of said first and second mirrors and the optical characteristics of other elements in the resonant cavity are additionally chosen to cause said magnification ratio to be within a range of substantially 1.3 to 2.2.

8. The pulsed laser optical arrangement according to any of claims 1-5 wherein said solid state light amplifying material is in the form of a cylindrically shaped rod having an axis substantially coincident with said resonant cavity axis and having a diameter that is substantially within a range of from 1.5 to 3.0 times the diameter of said second mirror within a circle of uniform reflectivity that is substantially the peak reflectivity divided by a square of the natural logarithm "e".

9. The pulsed laser optical arrangement according to any of claims 1-5 wherein said solid state light amplifying material is in the form of a cylindrically shaped rod having an axis substantially coincident with said resonant cavity axis and having a cross-sectional radius that is approximately 1.5 times a cross-sectional radius of the laser light beam therein from a peak intensity substantially at said cavity axis to an intensity that is approximately $1/e^2$ of its peak intensity.

10. In a pulsed laser system that includes:

a resonant cavity bounded by first and second mirrors and having an optical axis therebetween, said cavity being capable of supporting oscillations of laser light therein between said mirrors and directing a portion of the laser light out of the cavity as a pulsed laser output beam, a cylindrically shaped solid state rod of light amplifying material positioned within a resonant cavity and having an axis substantially coincident with said resonant cavity optical axis, a Q-switch positioned intermediate of said rod and one of the first and second mirrors along said optical axis, means for limiting said laser light oscillations within said resonant cavity to substantially a single longitudinal mode, and a flashlamp positioned to illuminate said rod with pulses of excitation radiation, an improvement limiting laser light oscillation within the cavity to substantially a single fundamental transverse mode and producing output laser light of substantially uniform cross-sectional intensity, comprising:

said second mirror having a partial reflectivity that varies as a substantially continuous smoothly varying function of radial position across a surface of said mirror, a maximum partial reflectivity occurring substantially coincident with said optical axis at a center of the varying partial reflectivity function, thereby providing partial transmission of laser light therethrough out of said resonant cavity as the pulsed laser output beam, a relative curvature of said first and second mirrors, an optical characteristic of other elements in said cavity and the radially varying partial reflectivity function of the second mirror being such that (1) a diameter of the laser light returning to the second mirror is greater than the diameter of the light reflected from the second mirror by a magnification ratio lying substantially within a range of from 1.3 to 2.2, and (2) said rod has a diameter that is substantially within a range of from 1.5 to 3.0 times the diameter of said second mirror within a circle of uniform reflectivity that is substantially the peak reflectivity divided by a square of the natural logarithm "e", and the maximum partial reflectivity of said second mirror being substantially less than fifty percent and less than substantially the quantity one divided by the square of said magnification ratio, whereby the laser beam oscillating within said resonant cavity is limited to substantially a single fundamental transverse mode of said laser light, and said output beam is characterized by a substantially uniform cross-sectional intensity profile.

* * * * *